May 1, 1923. 1,453,603
C. H. REDMAN
PRUNING SHEARS AND OTHER IMPLEMENT
Filed Oct. 23, 1920
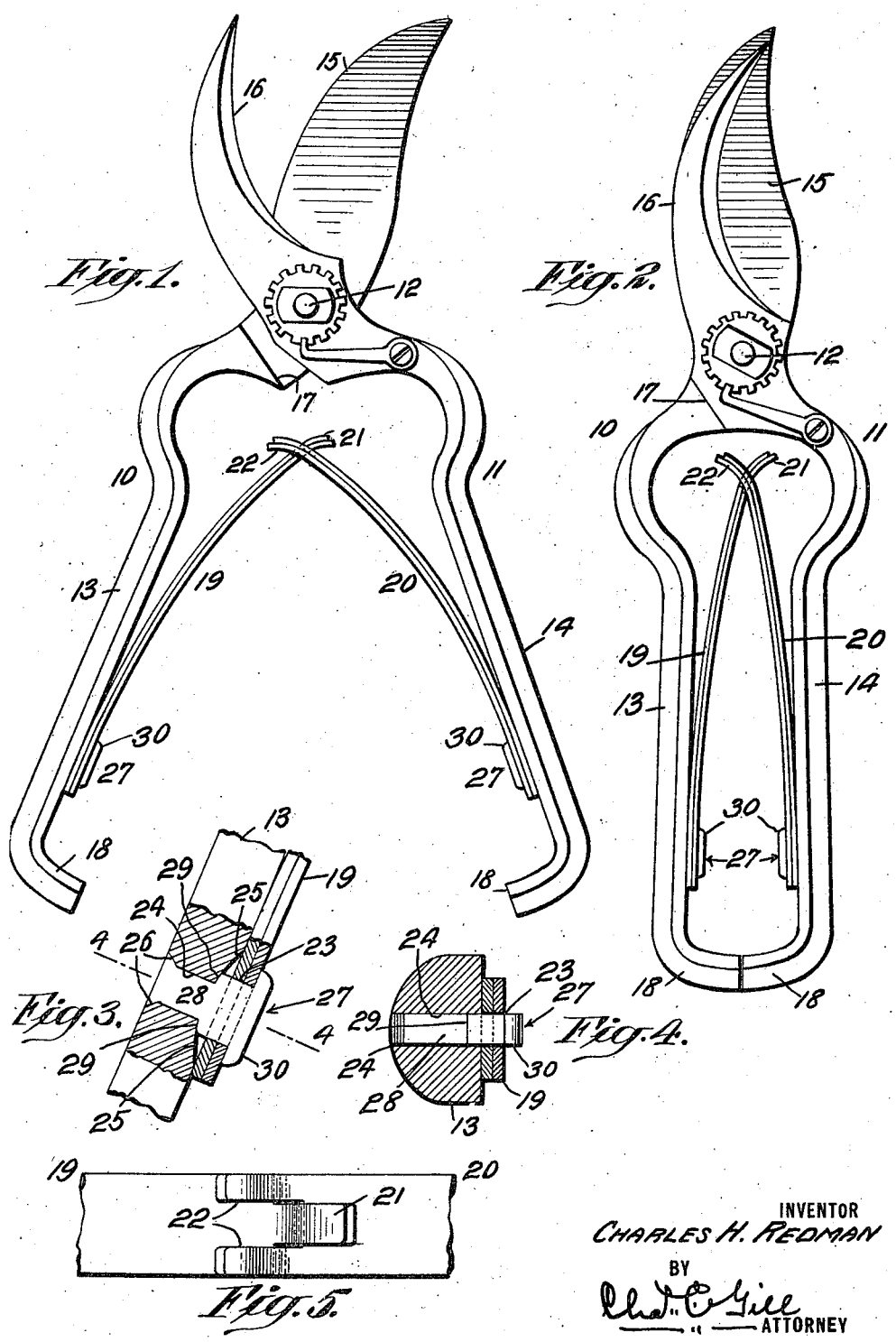
INVENTOR
CHARLES H. REDMAN
BY
ATTORNEY Patented May 1, 1923.

1,453,603

UNITED STATES PATENT OFFICE.

CHARLES H. REDMAN, OF EAST ORANGE, NEW JERSEY, ASSIGNOR TO BOKER CUTLERY & HARDWARE COMPANY, INC., OF NEW YORK, N. Y., A CORPORATION OF NEW YORK.

PRUNING SHEARS AND OTHER IMPLEMENT.

Application filed October 23, 1920. Serial No. 418,903.

*To all whom it may concern:*

Be it known that I, CHARLES H. REDMAN, a citizen of the United States, and a resident of East Orange, in the county of Essex and State of New Jersey, have invented certain new and useful Improvements in Pruning Shears and Other Implements, of which the following is a specification.

The invention pertains to improvements in implements of the class comprising two crossed pivoted bars serving at one end as handles and at the other end as shears, pliers or other mechanical purpose. I present my invention herein as embodied in pruning shears in which the crossed bars at their forward ends are in the shape of pruning blades, while at their other ends said bars serve as handles to be grasped in the hand of the user of the shear. The invention is more specifically directed to the handle portions of the bars and the springs normally acting to spread the handles and blades apart and resides in special means for adequately securing the shank ends of said springs to the handles of the implement.

In accordance with my invention I secure independent bar or leaf springs to the facing sides of the handle members of the implement, said springs converging under tension toward each other at their forward ends and being inter-engaged or interlocked by the slotting of the forward end of one spring and providing a tongue on the corresponding end of the other spring to enter and be confined in said slot, and the means securing said springs to said handle members being special rivets, with incidental features, whereby said springs become efficiently and adequately secured to the handle members and are properly held in due alignment and in predetermined position with respect to each other. My invention is confined more especially to the springs and the means securing them to the handle-members, and hence the invention is applicable to implements of the type made the subject hereof regardless of the formation of the forward ends of the crossed pivoted together bars.

The invention will be fully understood from the detailed description hereinafter presented, reference being had to the accompanying drawings, in which:

Fig. 1 is an elevation of a pruning shear constructed in accordance with and embodying my invention, the members of the shear being shown in open position;

Fig. 2 is a corresponding view of the same illustrating the relation of the parts when the members of the shear are in closed position;

Fig. 3 is a side elevation, partly in section, of a portion of one of the handle members and the adjacent end of the spring and illustrating the manner of securing the spring to the handle member;

Fig. 4 is a transverse section through the same, taken on the dotted line 4—4 of Fig. 3, and Fig. 5 is a top view, partly broken away and on a larger scale, of the forward interlocked ends of the bar or leaf springs.

In the drawings 10, 11 indicate, respectively, the two crossed bars which constitute the shear and which are secured together by means of a pivot 12 so that the members of the shear may have the customary operation. The members 10 and 11 are suitably conformed to produce the handle-members 13, 14 at one side of the pivot 12 and blades 15, 16 at the other side of said pivot. The blades 15, 16 are of a character adapted for a pruning shear and are of well-known outline and not specifically claimed herein. The handle-members 13, 14 are spaced apart and may abut at their forward ends at the shoulder 17 and at their outer ends have inwardly bent portions 18, as shown in Fig. 2. My invention is not confined to the special outline of the handle-members 13, 14 but is directed more particularly in the spring-mechanism I apply to said members for normally pressing the same in a direction from each other and which necessitates the closing together of the handle-members by a grasp of the hand during the use of the blade-members 15, 16 in pruning.

My invention pertains more especially to the spring or bar members 19, 20, respectively, and to the means for securing said members in proper relation to each other and to the handle-members. Each spring-member is preferably composed of two face to face leaves or bars, as shown; and the forward end of the spring-member 19, whether composed of one or more leaves, is cut away to form a centrally disposed tongue 21, shown in detail in Fig. 5, while the forward end of the spring-member 20 is forked or slotted, as at 22, to receive the tongue 21, said fork and tongue serving to interlock or interengage the forward ends of the spring-members and at the same time permit said members to have their proper yielding or sliding movements with relation to each other during the opening and closing of the handle-members 13, 14. The upper portion of the spring-member 19 is flexed toward the upper end of the spring-member 20, and the upper portion of the spring-member 20 is flexed toward and against the upper end of the spring-member 19, bearing against said member 19 at the opposite sides of the tongue 21. The general body-portion of the spring members 19, 20 converge on curved lines extending to the tongue 21 and fork 22, as shown, and at their forward ends said members, by the presence of the tongue and fork, cross each other and always maintain this relation during the use of the instrument. The tongue 21 is deflected laterally or toward the right, looking at Fig. 1, from the general line of the spring-member 19, and the members of the fork 22 are deflected toward the left from the general line of the spring-member 20, and by this construction the adjoining forward ends of the spring-members 19, 20 are permitted to have a reliable inter-engagement with each other and maintain their proper relation to each other during the movement of the handle-members 13, 14, regardless of the roughness or the speed with which said members may be operated.

The rear or outer ends of each spring-member 19, 20 is formed with an elongated polygonal hole or aperture 23 to align with and match the inner enlarged end of an opening or hole 24 in the handle-member against which the end of the spring-member is to be secured, as shown in Fig. 3. The handle-member at its inner face and at the inner end of the opening or hole 24 is recessed, as at 25, and said handle member at the outer end of said hole 24 is beveled outwardly, as at 26. The spring-member is secured to the handle-member by means of a rivet 27 whose shank portion 28 at its inner end is oblong and forms shoulders 29 to engage the inner surface of the handle-member at the oblong enlarged inner end of the hole or opening 24, and said shank is upset at its outer end to engage the beveled walls 26 of the outer end of said opening or hole 24, as I illustrate in Fig. 3. The rivet 27 has a head 30 which engages the spring-member above and below the oblong opening 23 therein, said head by extending beyond the ends of the opening 23 serving to combine with the outer end of the rivet in firmly securing the handle-member and spring-member of the shear in fixed and proper relation to each other. The opening 23 in the spring-member is elongated longitudinally of said member and the inner oblong portion of the shank of the rivet 27 is correspondingly shaped and closely fits said opening and also the inner enlarged end of the opening 24 in the handle-member, the whole construction serving not only to secure the spring-members in place but to prevent under any and all circumstances any swiveling of the spring-members outwardly or otherwise on the handle-members. The rivets 27 for the spring-members 19, 20 are exactly alike and perform corresponding duties, and hence I only illustrate the details of one of said rivets in Figs. 3 and 4.

The spring-members hereinbefore described are particularly desirable in that they are capable of ready manufacture and application to the handle-members and also, while properly spreading the handle-members apart, have such cooperative action that they offer a limited resistance to the hand during the closing action of the handle members, thus relieving the hand of undue strain. The manner of securing the spring-members to the handle-members is one of great efficiency. The fact that the oblong portions of the shanks of the rivets 27 just back of the heads of said rivets, fit within the oblong openings in the springs and also the oblong recesses or enlargements at the inner ends of the openings in the handle members, assures the correct securing of the springs and their proper alignment and the holding of said springs in their predetermined position and relation to each other. The tongue-and-fork interengagement of the oppositely directed forward ends of the springs serve to control said ends of the springs in their relation to each other and also the distance the handle-members shall open apart, as well as to cooperate with the other features of the construction in maintaining the due alignment of the springs.

What I claim as my invention and desire to secure by Letters Patent, is:

1. Means for securing the opening spring-members to the handle-members of an implement of the character described, comprising, for each handle-member, a hole extending through said member enlarged at opposite sides of its inner end to form a longitudinally elongated polygonal recess, a longitudinally elongated polygonal hole in the spring-member aligned with the enlarged inner end of the hole in the handle-member, and a rivet extending through said holes in said handle and spring-members and having a head engaging the face of the spring, a longitudinally elongated polygonal shank portion engaging the walls of said hole in the spring and those of said recess and a shank-portion fitting the remaining portion of the hole in the handle-member and headed at its outer end.

2. Means for securing the opening spring-members to the handle-members of an implement of the character described, comprising, for each handle member, a flat rivet which has an oblong head to engage the face of the spring, behind said head a shank-portion which is oblong longitudinally of the handle-member and spring and an outer shank-portion of reduced diameter, said spring having an oblong hole receiving said oblong portion of said rivet, and the handle-member having a hole through it whose outer end edges are oppositely outwardly beveled and whose inner end is enlarged at its upper and lower edges to form a longitudinally elongated recess having flat sides and closely receiving said oblong portion of the rivet and said hole at its other portion receiving that part of the rivet which is of reduced diameter and which at its outer end is headed in the beveled outer end of said hole.

Signed at Newark, in the county of Essex and State of New Jersey, this 5th day of October, A. D. 1920.

CHARLES H. REDMAN.